United States Patent Office 3,032,247
Patented May 1, 1962

3,032,247
CONVEYOR ARRANGEMENT FOR CONVEYING EMULSION CARRIERS IN STRIP OR SHEET FORM THROUGH AT LEAST ONE TREATMENT DEVICE
Herbert Lechner, 91 Turkenstrasse, Munich, Germany
Filed Oct. 23, 1959, Ser. No. 848,391
Claims priority, application Germany Oct. 25, 1958
6 Claims. (Cl. 226—173)

The United States patent specification No. 2,869,865 has for its object a conveyor arrangement for conveying strip material, comprising in combination a conveyor band made of deformable material; gripping means attached to and carried by said conveyor band in the regions of the opposite edge portions of the same and extending upwardly from one face thereof for gripping a strip material; and guide roller means for guiding said conveyor band, operatively connected with the same and adapted to engage successively longitudinal portions of said conveyor band, at least said portion of said guide roller means over which one of said opposite edge portions of said conveyor band passes being tapered so that the gripping means carried by said one edge portion of said conveyor band when passing over said guide roller means will be turned away from the corresponding gripping means carried by the other edge portion of said conveyor band.

The above-described conveyor arrangement affords the advantage that the conveyor band can be automatically loaded and unloaded.

The present invention provides a further development of and improvement in the arrangement of the aforementioned United States patent specification. Thus, the present invention also relates to an arrangement adapted to convey objects in strip or sheet form, particularly light-sensitive layers of material to be subjected to a certain chemical and/or physical treatment through at least one treatment device by means of at least one endless conveyor band running over sets of guide rollers, the said conveyor band comprising means for gripping the said layer or emulsion carriers, the said gripping means being adapted frictionally to engage the edges of said emulsion carriers and thus to establish a releasable grip between the conveyor band and the emulsion carriers, there being provided, at the loading station as well as at the unloading station, means adapted to increase the relative spacing apart of the said gripping means, the present invention being characterized by the fact that the said conveyor band together with its gripping means is adapted to be at least partially spread in a transverse direction, being made, for example, of a suitable elastic material, and that the means serving to increase the spacing apart of the said gripping means are made in the form of a cam member having cam surfaces adapted to spread the said gripping means apart. This development and improvement of the device of the aforementioned U.S. patent affords an advantage in that the said gripping means can be made to have a continuous shape, this being of advantage in regard to economical manufacture of the device.

In a particularly effective embodiment of the invention, the conveyor band has formed thereon lateral extensions terminating in bead-like enlargements, and the guide rollers are provided with guide grooves for the said bead-like enlargements. Thus, for the purpose of spreading the conveyor band apart, the said band is provided at its extreme marginal portions with bead-like enlargements which, when caused to cooperate with a suitably shaped curved guide way provided at the film loading and unloading points will be deformed elastically in such a manner as to increase the width of the conveyor band.

The same principle of the present invention may be used in a different embodiment in which the said cam member is disposed above the conveyor band and in the path of the said gripping means. When the conveyor band moves towards the loading station or the unloading station, the said gripping means will engage the respective cam member, the gripping means being thus spread apart to release the film. This modified embodiment affords a further advantage in that it is no longer necessary to make the entire conveyor band of an elastic material, but that it is sufficient only to make the gripping means of the conveyor band of an elastic material so as to enable them to be spread apart by the action of the said cam member.

Where the gripping means according to the present invention are made continuous it is no longer possible for the film to assume a wavy shape on the conveyor band as would be the case if the gripping means were made in the form of separate projections provided in the marginal zones of the conveyor bands. The necessary flat position of the film on the conveyor band tends to produce difficulties where the conveyor band is guided about guide rollers of relatively small diameter as this produces differences in the peripheral lengths so that the film is placed under additional stress at such points. In order to avoid such additional stressing of the film, the present invention, according to another of its features, provides for the film or emulsion carrier proper to be guided over the guide rollers in a plane containing the largest peripheral length thereof. In a particularly advantageous embodiment of the feature of the present invention, that portion of the conveyor band serving to support the emulsion carrier is adapted to be received in a peripheral groove of the guide rollers. This arrangement affords the advantage that the conveyor band carrying the film with it runs over the guide roller in such a manner that the film itself always lies in the neutral bending zone. During the passage of the conveyor band through a developing plant the bearing surfaces of the conveyor band will always lie in a common plane with the film held by the gripping means, this being true for any position or shape the conveyor band assumes during such passage. It will be understood that the principles of the present invention may advantageously be employed in devices or arrangements other than those forming the subject matter of the present invention or of the U.S. patent specification No. 2,869,865.

Other objects and features of the invention will become apparent as the description proceeds, especially when taken in conjunction with the accompanying drawing, illustrating a preferred embodiment of the invention, wherein.

Figure 1:
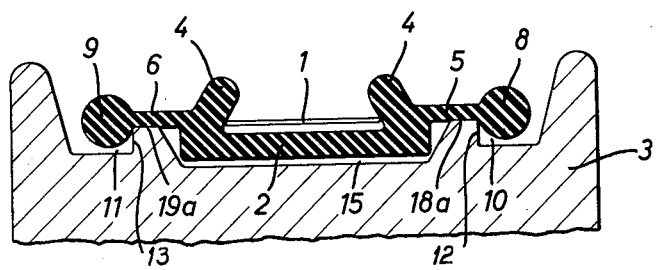
FIGS. 1 and 2 illustrate, in fragmentary longitudinal sections, an embodiment of means adapted to spread apart the conveyor band or its gripping means, respectively, FIG. 1 being a section showing the conveyor band before it is coming into contact with the cam member, and FIG. 2 being a section showing the conveyor band cooperating with the cam member.
Figure 2:
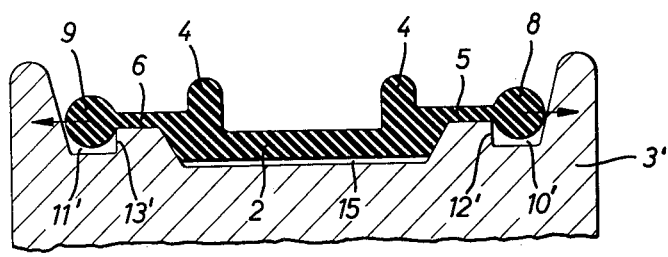

As shown in FIGS. 1 and 2, the emulsion carrier 1 to be treated is held in position by the gripping means of a conveyor band 2 which runs over a guide roller 3 or 3'. The gripping means 4 extends throughout the length of the conveyor band. The conveyor band has formed thereon lateral extensions 5 and 6 terminating in bead-like enlargements 8 and 9, respectively. The guide roller 3 has guide grooves 10 and 11 and guide roller 3' has guide grooves 10' and 11' for the said bead-like enlargements 8 and 9. As will be seen from a comparison of FIGS. 1 and 2, each of the guide grooves 10 and 11 has formed therein a guide track 12 or 13, and each of the grooves 10' and 11' has formed therein a cam track 12' or 13', respectively. The cam tracks 12' and 13' spread apart that portion of the conveyor band made of an elastic material that comes in contact therewith. The spreading apart of the conveyor band will cause the gripping means 4 to move away from their position shown in FIG. 1 in which they are inclined inwardly and to assume an erect or vertical position as shown in FIG. 2, the film or emulsion carrier 1 thus being released.

Figure 3:
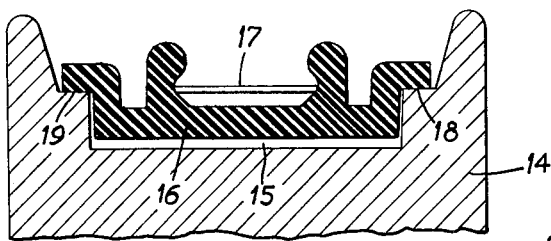
FIG. 3 illustrates an embodiment of a device which is independent of the remaining part of the principle of the invention, this device being adapted to avoid stressing the film during its movement together with the conveyor band.

Both the guide roller 3 of FIG. 1 and the guide roller 14 of FIG. 3 are provided with a central peripheral groove 15 whose width substantially corresponds to the width of that portion of the conveyor band 2 or 16, respectively, which supports the emulsion carrier 1 or 17, respectively. The portion of the conveyor band supporting the emulsion carrier is sufficiently recessed into the said groove 15 so that the bearing surfaces 18, 19 or 18a, 19a, respectively, of the conveyor band 2 or 16, when passing through the developing plant, will lie in a common plane with the emulsion carrier. Thus, since the effective peripheral length of the conveyor band is the same as that of the film or emulsion carrier, the film will not be subjected to tensional stress at any point along its path through the developing plant.

What is claimed is:

1. In a conveyor for conveying a strip such as a light-sensitive film strip, in combination, an elongated stretchable conveyer band having a pair of spaced ribs extending longitudinally of said band and defining between themselves a space for accommodating a film strip or the like, said ribs engaging the strip at its side edges to support the latter and said ribs being co-extensive with said band; and cam means cooperating with said band for laterally stretching the same to move said ribs apart from each other to provide between the ribs a distance greater than the width of the film strip or the like so that the latter can be introduced between or removed from the space between said ribs.

2. In a conveyor for conveying an article such as a film strip or the like, in combination, an elongated conveyor band made of a stretchable material and having a pair of spaced integral gripping ribs co-extensive with said band and defining between themselves a space for accommodating the strip whose side edges are engaged by said ribs; roll means engaging said band for guiding the latter along a given path; and cam means forming part of said roll means and cooperating with said band for laterally stretching the latter at a region where the film strip or the like is to be introduced into or removed from the space between said ribs, so as to space said ribs from each other by a distance greater than the distance between said ribs when they engage the side edges of the film strip or the like.

3. In a conveyor as recited in claim 2, said band having opposed outer edge portions of enlarged cross section as compared to the immediately adjacent portions of said band and said cam means including camming grooves respectively receiving said enlarged edge portions for acting through the latter on said band.

4. In a conveyor, in combination, roll means; a conveyer band guided by said roll means and engaged by said roll means at a given radial distance from the axis of said roll means, said band including means for engaging a film strip or the like to be conveyed by said band at said radial distance from said axis so that during movement of said band and strip at least in part around the axis of said roll means there will be no tendency of the strip and band to move at different speeds.

5. In a conveyor for conveying film strips or the like, in combination, a guide roll formed with a peripheral groove whose base is located at a given radial distance from the center of said roll and having a pair of annular bearing surfaces on opposite sides of said groove and at a greater radial distance from the center of said roll than said base of said groove; and a conveyer band extending in part around said guide roll, having a longitudinal intermediate portion located in said groove and having a pair of elongated lateral portions engaging said bearing surfaces, said intermediate portion of said band having a pair of longitudinal gripping ribs co-extensive with said band and extending from said intermediate portion away from the axis of said roll, said ribs being adapted to engage a film strip or the like at its opposite side edges at the same distance from the roll axis as said bearing surfaces so that the band and film strip or the like will move at the same speed around the axis of said roll.

6. In a conveyor as recited in claim 5, said roll being formed outwardly of said bearing surfaces thereof with a pair of annular camming grooves and said band having a pair of beaded side edges respectively located in said camming grooves, said band being made of a stretchable material and said roll cooperating at said camming grooves thereof with said beaded edges of said band for laterally stretching the latter to increase the space between said gripping ribs so as to facilitate introduction or removal of a film strip or the like into or from the space between said ribs.

References Cited in the file of this patent
UNITED STATES PATENTS

| | | |
|---|---|---|
| 1,899,766 | McWilliams | Feb. 28, 1933 |
| 2,869,865 | Lechner | Jan. 20, 1959 |